(12) United States Patent
Ueda et al.

(10) Patent No.: US 8,596,551 B2
(45) Date of Patent: Dec. 3, 2013

(54) HUMIDITY CONTROL SYSTEM

(75) Inventors: Hiroki Ueda, Osaka (JP); Yasunori Okamoto, Osaka (JP); Hiroshi Noda, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 673 days.

(21) Appl. No.: 12/988,726

(22) PCT Filed: Apr. 21, 2009

(86) PCT No.: PCT/JP2009/001812
§ 371 (c)(1),
(2), (4) Date: Oct. 20, 2010

(87) PCT Pub. No.: WO2009/130885
PCT Pub. Date: Oct. 29, 2009

(65) Prior Publication Data
US 2011/0031324 A1    Feb. 10, 2011

(30) Foreign Application Priority Data
Apr. 21, 2008 (JP) ................ 2008-110604

(51) Int. Cl.
*G05D 22/00* (2006.01)
*F25B 17/00* (2006.01)

(52) U.S. Cl.
USPC ................ 236/44 A; 62/94; 62/232

(58) Field of Classification Search
USPC .......... 62/93, 94, 232, 271; 236/44 A; 96/145
See application file for complete search history.

(56) References Cited

U.S. PATENT DOCUMENTS

| 2006/0162367 | A1 | 7/2006 | Yabu et al. |
| 2006/0207429 | A1 | 9/2006 | Yabu |
| 2006/0260332 | A1* | 11/2006 | Matsui et al. ............... 62/94 |
| 2007/0028639 | A1 | 2/2007 | Ikegami et al. |
| 2007/0180844 | A1 | 8/2007 | Fujiyoshi et al. |

FOREIGN PATENT DOCUMENTS

| CN | 1671999 A | 9/2005 |
| CN | 1836135 A | 9/2006 |
| CN | 1926388 A | 3/2007 |
| JP | 2001-33155 A | 2/2001 |
| JP | 2004-60954 A | 2/2004 |
| JP | 2005-291700 A | 10/2005 |
| KR | 10-2006-0020622 A | 3/2006 |
| KR | 10-2006-0030374 A | 4/2006 |

* cited by examiner

*Primary Examiner* — Marc Norman
(74) *Attorney, Agent, or Firm* — Birch, Stewart, Kolasch & Birch, LLP

(57) ABSTRACT

A humidity control system includes three dehumidifiers. Each of the dehumidifiers alternately switches between first batch operation in which air whose moisture has been adsorbed in a first adsorption component is supplied to a room and air heated in a heat exchanger is exhausted to outside the room through a second adsorption component, and second batch operation in which air whose moisture has been adsorbed in the second adsorption component is supplied to the room and air heated in the heat exchanger is exhausted to outside the room through the first adsorption component. The system further includes: a controller allowing the switchings of the dehumidifiers to be performed at different timings; and a chamber collecting air to be supplied from the dehumidifiers to the room.

2 Claims, 6 Drawing Sheets

HUMIDITY CONTROL SYSTEM

TECHNICAL FIELD

The present disclosure relates to humidity control systems, and more particularly to temperature control of air supplied from dehumidifiers to a room.

BACKGROUND ART

Dehumidifiers for dehumidifying rooms or other space have been widely known. A conventional dehumidifier includes two adsorption components which alternately dehumidify air.

Patent Document 1 describes a dehumidifier of this type. In the dehumidifier, a first adsorption component and a second adsorption component are provided in an air passageway in a casing. In each of the adsorption components, an adsorbent for adsorbing or desorbing moisture is supported on a base material in which air is allowed to flow. In the casing, a condenser (i.e., a heating mechanism) for heating air is provided upstream of the adsorption components in the direction of an air flow.

The dehumidifier shown in Patent Document 1 alternately performs two operations as follows. First, in a first operation, moisture in the air is adsorbed by the first adsorption component so that the air is dehumidified. The dehumidified air is supplied to a room. In the first operation, the air heated by the condenser is supplied to the second adsorption component so that the second adsorption component is heated. Consequently, moisture is released from the second adsorption component into the air, thereby reproducing the second adsorption component. The air used for the reproduction of the second adsorption component is exhausted to outside the room. On the other hand, in a second operation, moisture in the air is adsorbed by the second adsorption component, and at the same time, the first adsorption component is reproduced. In this manner, the dehumidifier performs a so-called batch operation in which the dehumidifier alternately switches between the first operation and the second operation after each predetermined time, thereby continuously dehumidifying the air in the room without degradation of adsorption performance (i.e., dehumidification performance) of the adsorption components.

CITATION LIST

Patent Document

Patent Document 1: Japanese Patent Publication No. 2004-60954

SUMMARY OF THE INVENTION

Technical Problem

As described above, in the dehumidifier which alternately performs two operations, in order to release moisture from the adsorption component in the reproduction state, air heated by the heating mechanism is supplied to increase the temperature of this adsorption component. Thus, immediately after switching between the two operations (i.e., the batch operation), the temperature of the adsorption component which has changed from the reproduction state to the adsorption state is still relatively high in some cases. Consequently, air at a relatively high temperature is disadvantageously supplied to a room immediately after switching of the batch operation.

This problem will be specifically described with reference to FIG. 7. In FIG. 7, Ta indicates a change with time in the temperature of air heated by the heating mechanism (i.e., the reproduction temperature of the adsorption component), Tb indicates a change with time in the temperature of air (supplied air) to be supplied to a room, and each broken line indicates a switching time of the batch operation.

As shown in FIG. 7, the temperature of the adsorption component is heated to a temperature of around 60° C. Thus, when the adsorption component in the reproduction state switches to the adsorption component in the adsorption state in the next operation, the temperature of the adsorption component in the adsorption state is still around 60° C. immediately after the switching. Accordingly, immediately after the switching of the batch operation, the temperature of the supplied air is at the maximum (i.e., about 45° C.), and then the adsorption component in the adsorption state is gradually cooled so that the temperature of the supplied air decreases. Immediately before an end of the batch operation, the temperature of the supplied air reaches the lowest temperature (i.e., about 35° C.). Thereafter, when the next batch operation is performed, the temperature of the supplied air reaches the highest temperature again.

As described above, in each batch operation of the conventional dehumidifier, the influence of heat remaining in the adsorption component in the reproduction state significantly changes the temperature of air to be supplied to a room. As a result, the room temperature cannot be kept constant, thereby degrading the thermal environment.

In addition, the dehumidifier described above may be applied to dehumidify a space which requires temperature control with a relatively high accuracy (e.g., ±2° C.), such as cleanrooms of semiconductor factories and food factories. In such cases, a considerable change in the temperature of supplied air hinders desired temperature control, thereby disadvantageously degrading quality control.

It is therefore an object of the present invention to reduce a temperature change of air supplied from dehumidifiers to a room.

Solution to the Problem

A first aspect of the present invention is directed to a humidity control system including a plurality of dehumidifiers (10a, 10b, 10c) each including a casing (11) in which air flows, two adsorption components provided in the casing (11) and adsorbing moisture in air, and a heating mechanism (45) provided in the casing (11) and heating air to be supplied to the adsorption components, wherein each of the dehumidifiers (10a, 10b, 10c) alternately switches between a first operation in which air whose moisture has been adsorbed in the first adsorption component (61) is supplied to a room and air heated in the heating mechanism (45) is exhausted to outside the room through the second adsorption component (62), and a second operation in which air whose moisture has been adsorbed in the second adsorption component (62) is supplied to the room and air heated in the heating mechanism (45) is exhausted to outside the room through the first adsorption component (61).

The humidity control system of the first aspect further includes: a control mechanism (80) configured to control the dehumidifiers (10a, 10b, 10c) such that the switchings of the respective dehumidifiers (10a, 10b, 10c) are performed at different timings; and an air collecting mechanism (90) configured to collect air to be supplied from the dehumidifiers (10a, 10b, 10c) to the room.

In the first aspect, the switchings of the respective dehumidifiers (10a, 10b, 10c) from the first operation to the second operation, or from the second operation to the first operation, are performed at different timings. Accordingly, the temperatures of air supplied from the respective dehumidifiers (10a, 10b, 10c) differ from one another. Then, the air collecting mechanism (90) collects and mixes air supplied from the dehumidifiers (10a, 10b, 10c). Accordingly, the temperature of the air in the air collecting mechanism (90) becomes an average temperature of air supplied from the dehumidifiers (10a, 10b, 10c). Thereafter, the mixed air is supplied from the air collecting mechanism (90) to the room.

In a second aspect of the present invention, in the humidity control system of the first aspect, the control mechanism (80) controls the dehumidifiers (10a, 10b, 10c) such that the switchings of the respective dehumidifiers (10a, 10b, 10c) are sequentially performed at time intervals of predetermined times.

In the second aspect, the switchings of the respective dehumidifiers (10a, 10b, 10e) from the first operation to the second operation, or from the second operation to the first operation, are sequentially performed at time intervals of predetermined times. Then, the air collecting mechanism (90) collects and mixes air supplied from the dehumidifiers (10a, 10b, 10c). Accordingly, the temperature of the air in the air collecting mechanism (90) becomes an average temperature of air supplied from the dehumidifiers (10a, 10b, 10c). Thereafter, the mixed air is supplied from the air collecting mechanism (90) to the room.

Advantages of the Invention

In the first aspect, switchings of the respective dehumidifiers (10a, 10b, 10c) (from the first operation to the second operation or from the second operation to the first operation) are performed at different timings. Accordingly, the temperatures of air supplied from the respective dehumidifiers (10a, 10b, 10c) differ from one another. In addition, the air collecting mechanism (90) can collect air supplied from the dehumidifiers (10a, 10b, 10c). Accordingly, air at different temperatures supplied from the respective dehumidifiers (10a, 10b, 10c) can be mixed in the air collecting mechanism (90).

Specifically, in the air collecting mechanism (90), air at different temperatures is always mixed, and thus, a change in the average air temperature in the air collecting mechanism (90) can be reduced. Accordingly, the air whose temperature has been averaged by mixing can be supplied to the room. As a result, a change in the temperature of air supplied from the dehumidifiers (10a, 10b, 10c) to the room can be reduced.

In the second aspect, switchings of the respective dehumidifiers (10a, 10b, 10c) are sequentially performed at time intervals of predetermined times. Accordingly, the temperatures of air supplied from the respective dehumidifiers (10a, 10b, 10c) have a predetermined relationship at each time interval. That is, the temperature relationship among the air supplied from the dehumidifiers (10a, 10b, 10c) to be mixed in the air collecting mechanism (90) is constant, and thus, the average temperature of the mixed air is also constant. Accordingly, the air whose temperature has been averaged by mixing can be supplied to the room. As a result, a change in the temperature of air supplied from the dehumidifiers (10a, 10b, 10c) to the room can be reduced.

DESCRIPTION OF EMBODIMENTS

An embodiment of the present invention will be specifically described with reference to the drawings.

Figure 1:
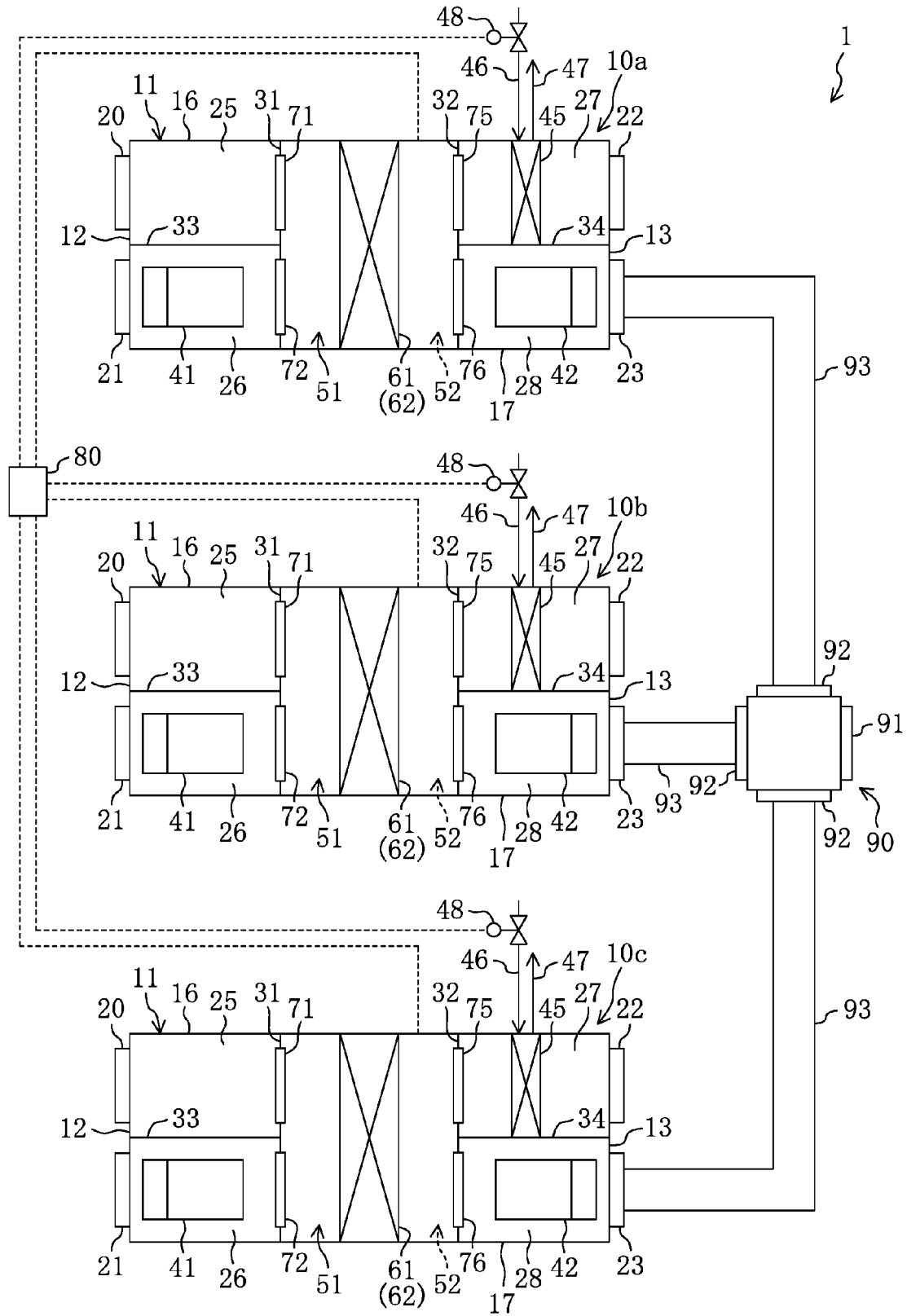
FIG. 1 is a cross-sectional view schematically illustrating a dehumidification system according an embodiment.

As illustrated in FIG. 1, a humidity control system (1) according to the present invention dehumidifies cleanrooms of semiconductor factories and rooms in food factories.

The humidity control system (1) according to this embodiment includes three dehumidifiers (10a, 10b, 10c), a controller (80) as a control mechanism for controlling the dehumidifiers (10a, 10b, 10c), and a chamber (90) as an air collecting mechanism.

First, the dehumidifiers (10a, 10b, 10c) are described. The dehumidifiers include a first dehumidifier (10a), a second dehumidifier (10b), and a third dehumidifier (10c). These three dehumidifiers (10a, 10b, 10c) have the same configuration.

Figure 2:
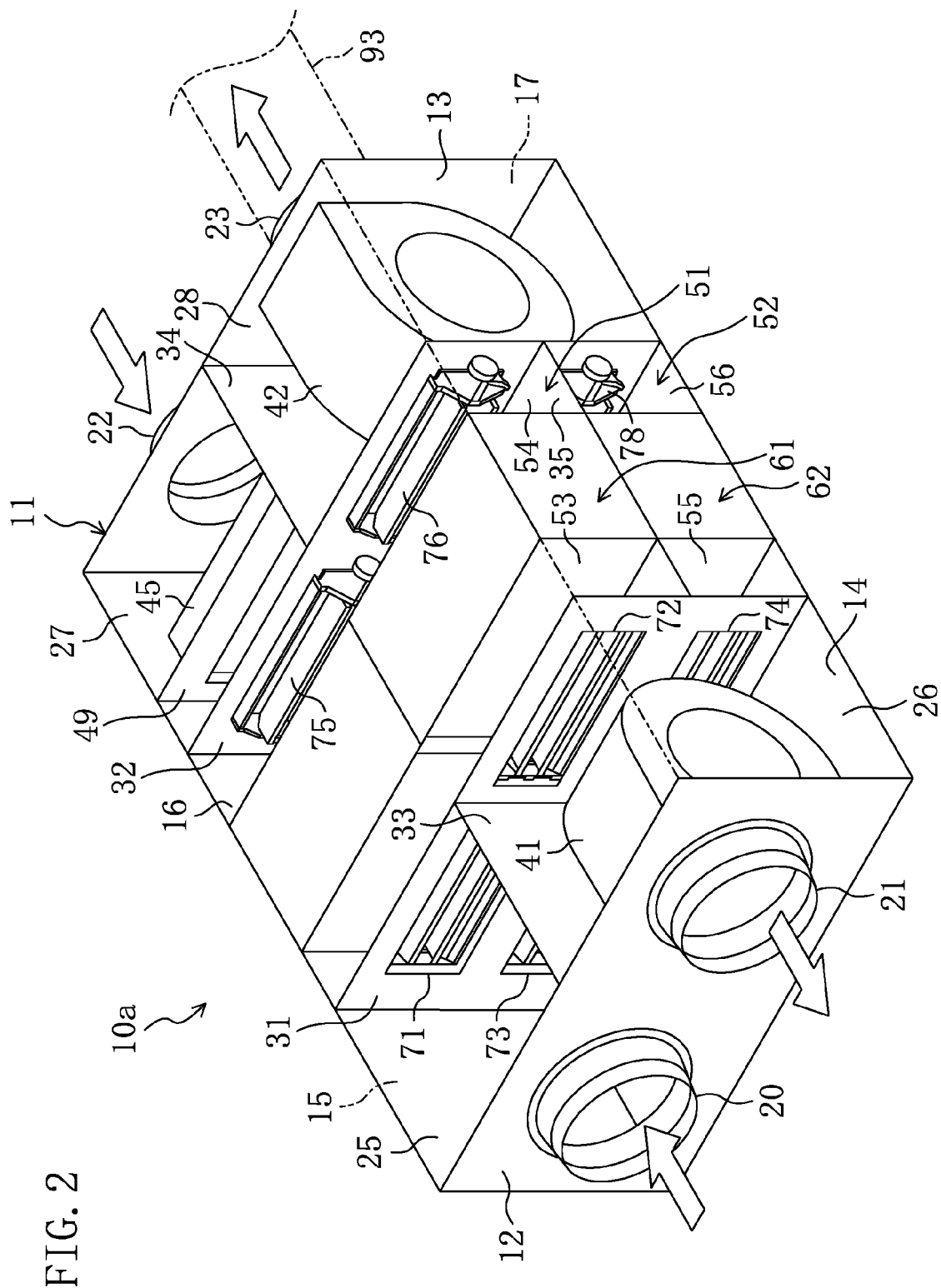
FIG. 2 is a perspective view schematically illustrating a dehumidifier according to the embodiment.
Figure 3:
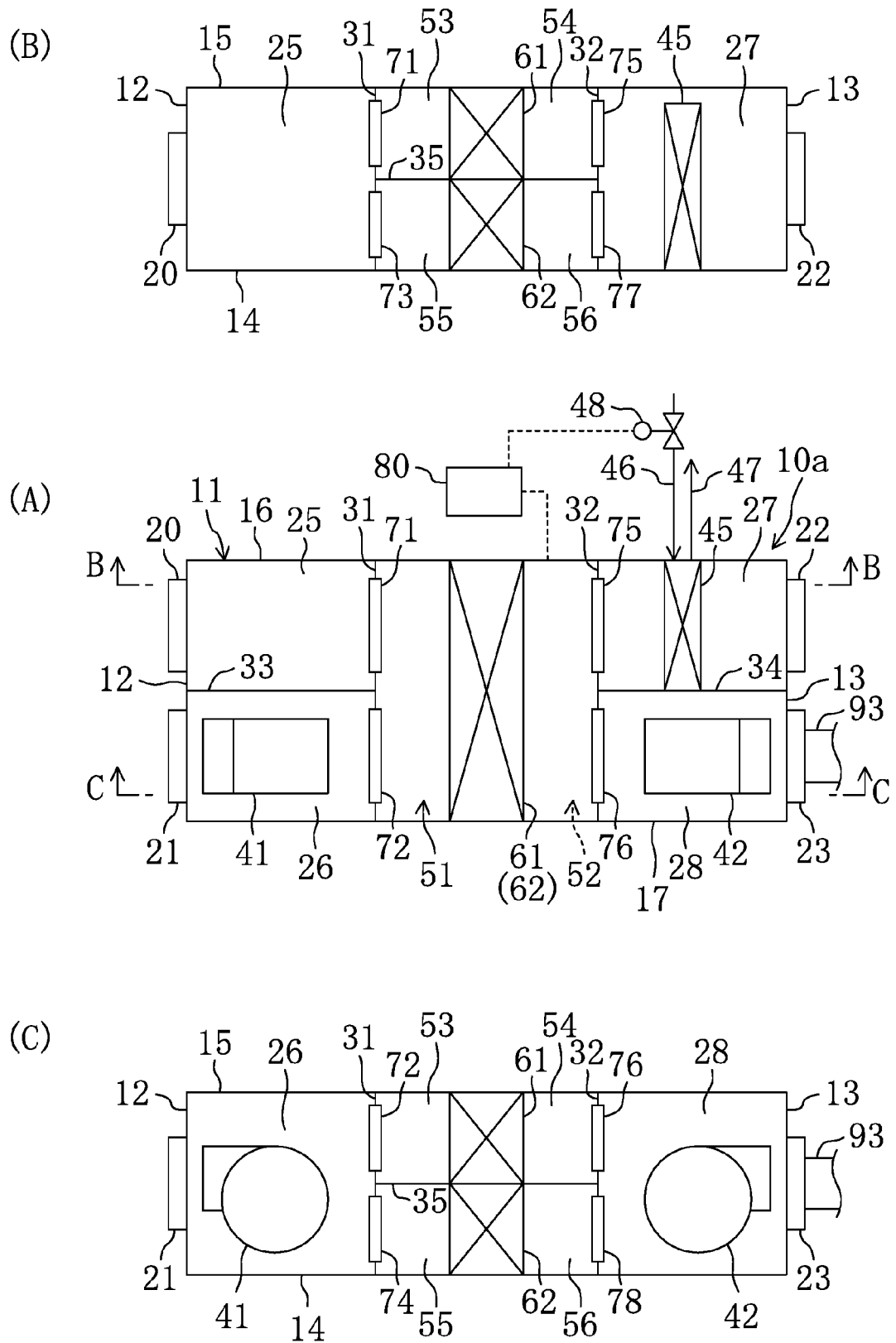
FIG. 3 is a cross-sectional view schematically illustrating the dehumidifiers of the embodiment.

As illustrated in FIGS. 2 and 3, the first dehumidifier (10a) of this embodiment includes a casing (11). The casing (11) is in the shape of a rectangular parallelepiped elongated in the front and rear directions. The casing (11) includes a first panel (12) at the front, a second panel (13) at the rear, a bottom plate (14) at the bottom, and a top plate (15) at the top. In the casing (11), a first side plate (16) is provided at the left in the width direction, and a second side plate (17) is provided at the right in the width direction. An air passageway in which air flows is formed in the casing (11).

The first panel (12) has a first inlet (20) located close to the left end, and an exhaust opening (21) located close to the right end. The second panel (13) has a second inlet (22) located close to the left end, and an intake opening (23) located close to the right end. The first inlet opening (20), the exhaust opening (21), and the second inlet opening (22) serve as duct connection ports to which air ducts (not shown) are coupled. The first inlet opening (20), the exhaust opening (21), and the second inlet opening (22) communicate with outdoor space through the air ducts. The intake opening (23) serves as a duct connection port to which a collection duct (93) is coupled. The intake opening (23) communicates with indoor space through the collection duct (93).

A first partition plate (31) and a second partition plate (32) are formed so as to stand in the casing (11). The first partition plate (31) and the second partition plate (32) are parallel to the first panel (12) and the second panel (13). The first partition plate (31) is located closer to the first panel (12), and the second partition plate (32) is located closer to the second panel (13).

An exhaust-side partition plate (33) is formed so as to stand between the first panel (12) and the first partition plate (31). A first suction passageway (25) is defined at the left of the exhaust-side partition plate (33), and an exhaust passageway

(26) is located at the right of the exhaust-side partition plate (33). The first suction passageway (25) communicates with the first inlet opening (20), and the exhaust passageway (26) communicates with the exhaust opening (21). The exhaust passageway (26) houses an exhaust fan (41). The exhaust fan (41) is a centrifugal multiblade fan (a so-called sirocco fan).

An intake-side partition plate (34) is formed so as to stand between the second panel (13) and the second partition plate (32). A second suction passageway (27) is defined at the left of the intake-side partition plate (34), and an intake passageway (28) is defined at the right of the intake-side partition plate (34). The second suction passageway (27) communicates with the second inlet opening (22). The intake passageway (28) communicates with the intake opening (23). The intake passageway (28) houses an intake fan (42). The intake fan (42) is a centrifugal multiblade fan (a so-called sirocco fan).

The second suction passageway (27) houses a heat exchanger (45). The heat exchanger (45) is, for example, a plate-type heat exchanger. The heat exchanger (45) is connected to an inflow pipe (46) and an outflow pipe (47) through the casing (11) (see, FIG. 3). Hot water is supplied to the heat exchanger (45) through the inflow pipe (46). This hot water is generated by utilizing waste heat from other heat source equipment in a factory, for example. In the heat exchanger (45), heat exchange is performed between the hot water and the air, thereby heating the air. That is, the heat exchanger (45) is one specific example of a heating mechanism for heating the air.

The inflow pipe (46) has a solenoid valve (48) as a shut-off valve. When the solenoid valve (48) is closed, the supply of hot water to the heat exchanger (45) is stopped, and the heat exchanger (45) is substantially stopped. On the second suction passageway (27), a frame (49) is provided downstream of the heat exchanger (45). The frame (49) is in the shape of a plate extending along the heat exchanger (45), and covers the second suction passageway (27). In the center of the frame (49), an air opening allowing a flow of air which has passed through the heat exchanger (45) is formed. The frame (49) is not shown in the drawings except FIG. 2.

An intermediate partition plate (35) is horizontally oriented between the first partition plate (31) and the second partition plate (32). A first adsorption room (51) is defined above the intermediate partition plate (35), and a second adsorption room (52) is defined below the intermediate partition plate (35). The first adsorption room (51) houses a first adsorption component (61). The second adsorption room (52) houses a second adsorption component (62).

Each of the adsorption components is in the shape of an elongated rectangular parallelepiped extending laterally from the first side plate (16) to the second side plate (17). In the first adsorption room (51), an exhaust-side upper passageway (53) is defined between the first adsorption component (61) and the first partition plate (31), and an intake-side upper passageway (54) is defined between the first adsorption component (61) and the second partition plate (32). In the second adsorption room (52), an exhaust-side lower passageway (55) is defined between the second adsorption component (62) and the first partition plate (31), and an intake-side lower passageway (56) is defined between the second adsorption component (62) and the second partition plate (32).

Each of the adsorption components has a divided structure, i.e., is divided into two at an intermediate position in the longitudinal direction thereof. That is, each of the adsorption components is made of two adsorption elements which are adjacent to each other in the lateral direction. Each of the adsorption elements includes a base material part in which air can flow in the front and rear directions and an adsorbent supported on the base material part. As the adsorbent of the adsorption element, a material capable of adsorbing moisture (water vapor) in the air, such as zeolite, silica gel, active carbon, and organic polymeric materials having hydrophilic functional groups, may be used.

The first partition plate (31) includes first through fourth exhaust-side dampers (71-74). Each of the exhaust-side dampers (71-74) is a damper which is freely opened and closed and is used for connecting/disconnecting an associated one of the adsorption rooms (51, 52) to the first suction passageway (25) or the exhaust passageway (26). The first exhaust-side damper (71) is provided in an upper left portion of the first partition plate (31), the second exhaust-side damper (72) is provided in an upper right portion of the first partition plate (31), the third exhaust-side damper (73) is provided in a lower left portion of the first partition plate (31), and the fourth exhaust-side damper (74) is provided in a lower right portion of the first partition plate (31). Opening/closing of the first exhaust-side damper (71) connects/disconnects the first suction passageway (25) to the exhaust-side upper passageway (53). Opening/closing of the second exhaust-side damper (72) connects/disconnects the exhaust passageway (26) to the exhaust-side upper passageway (53). Opening/closing of the third exhaust-side damper (73) connects/disconnects the first suction passageway (25) to the exhaust-side lower passageway (55). Opening/closing of the fourth exhaust-side damper (74) connects/disconnects the exhaust passageway (26) to the exhaust-side lower passageway (55).

The second partition plate (32) includes fifth through eighth intake-side dampers (75-78). Each of the intake-side dampers (75-78) is a damper which is freely opened and closed and is used for connecting/disconnecting an associated one of the adsorption rooms (51, 52) to the second suction passageway (27) or the intake passageway (28). The first intake-side damper (75) is provided in an upper left portion of the second partition plate (32), the second intake-side damper (76) is provided in an upper right portion of the second partition plate (32), the third intake-side damper (77) is provided in a lower left portion of the second partition plate (32), and the fourth intake-side damper (78) is provided in a lower right portion of the second partition plate (32). Opening/closing of the first intake-side damper (75) connects/disconnects the second suction passageway (27) to the intake-side upper passageway (54). Opening/closing of the second intake-side damper (76) connects/disconnects intake passageway (28) to the intake-side upper passageway (54). Opening/closing of the third intake-side damper (77) connects/disconnects the second suction passageway (27) to the intake-side lower passageway (56). Opening/closing of the fourth intake-side damper (78) connects/disconnects the intake passageway (28) to the intake-side lower passageway (56).

The chamber (90) is used for collecting air supplied from the dehumidifiers (10a, 10b, 10c) to a room. The inside of the chamber (90) is in the shape of a hollow rectangular box. The chamber (90) has three chamber inlets (92) and one chamber intake opening (91) in the side surfaces thereof.

The chamber inlets (92) serve as duct connection ports connected to the collection duct (93). The chamber inlets (92, 92, 92) are respectively connected to the intake openings (23) of the dehumidifiers (10a, 10b, 10c) through the collection duct (93). That is, air blown from the dehumidifiers (10a, 10b, 10c) passes through the collection duct (93), and is collected in the chamber (90). Then, in the chamber (90), the air blown from the dehumidifiers (10a, 10b, 10c) is mixed together.

The chamber intake opening (91) serves as a duct connection port connected to an air duct (not shown). The chamber intake opening (91) communicates with indoor space through the air duct.

The controller (80) is configured to control start/stop of the exhaust fans (41) and the intake fans (42), opening/closing of the dampers (71-78), and opening/closing of the solenoid valves (48). Specifically, the controller (80) is connected to the dehumidifiers (10a, 10b, 10c), controls start/stop of the exhaust fans (41) and the intake fans (42) in the dehumidifiers (10a, 10b, 10c), and opens/closes the dampers (71-78) to control air flows in the air passageways in the casings (11). The controller (80) opens/closes the solenoid valve (48) in each of the dehumidifiers (10a, 10b, 10c) to control ON/OFF of heating operation of the heat exchanger (45). The method for controlling ON/OFF of heating operation of the heat exchanger (45) is not limited to the above-described method, and a method of stopping a pump for supplying hot water to the heat exchanger (45) or switching a hot-water circuit to bypass hot water flowing in the inflow pipe (46) to the outflow pipe (47), may be employed, for example.

The controller (80) is configured such that the dehumidifiers (10a, 10b, 10c) sequentially perform switching operations at time intervals of predetermined times (e.g., one to four minutes).

—Operational Behavior—

Dehumidification operation of the humidity control system (1) of this embodiment will now be described.

In each of the dehumidifiers (10a, 10b, 10c) of the humidity control system (1), the exhaust fan (41) and the intake fan (42) are in operating states. In the dehumidification operation, outdoor air (OA) as first air (i.e., air indicated by black arrows in FIG. 4; the same hereinafter) is taken in the casing (11) through the first inlet opening (20), and outdoor air (OA) as second air (i.e., air indicated by white arrows in FIG. 4; the same hereinafter) is taken in the casing (11) through the second inlet (22). In the dehumidification operation, each of the dampers (71-78) is switched between the open state and the closed state, thereby alternately performing a first operation (hereinafter referred to as a first batch operation) and a second operation (hereinafter referred to as a second batch operation), which will be described below.

In the first batch operation and the second batch operation of this embodiment, the solenoid valve (48) is opened, and the heat exchanger (45) always performs heating operation. Switching between the first batch operation and the second batch operation is performed at time intervals (e.g., after every five minutes) set by the controller (80). In the drawings for explaining operational behavior of the dehumidifiers (10a, 10b, 10c), dampers in the closed states are hatched, and dampers in the open states are unhatched, i.e., left as white.

<First Batch Operation>

Figure 4:
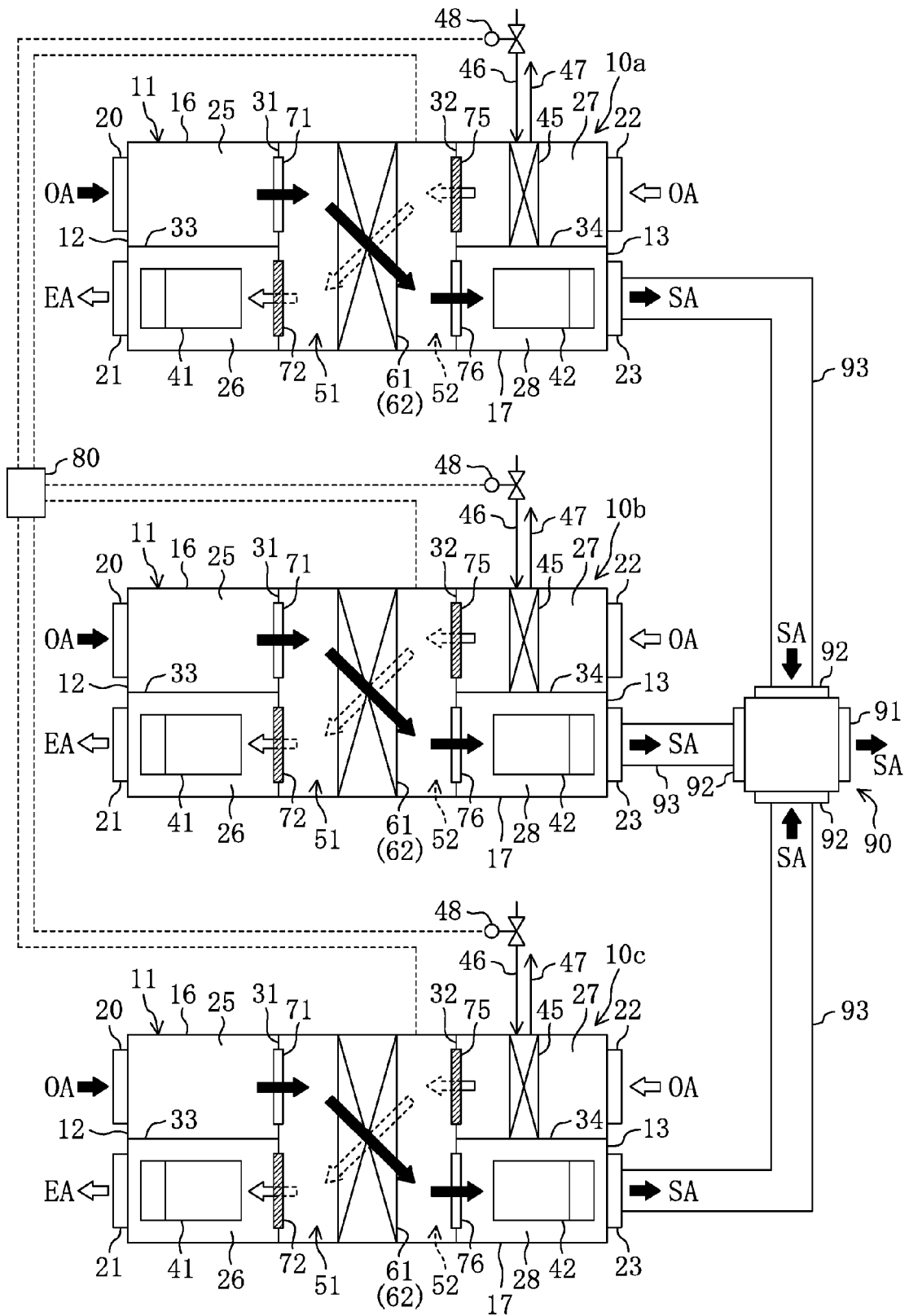
FIG. 4 is a cross-sectional view schematically illustrating a first batch operation of the dehumidification system of the embodiment.

As illustrated in FIG. 4, in the first batch operation, in each of the dehumidifiers (10a, 10b, 10c), the second exhaust-side damper (72), the third exhaust-side damper (73), the first intake-side damper (75), and the fourth intake-side damper (78) are closed, and the first exhaust-side damper (71), the fourth exhaust-side damper (74), the second intake-side damper (76), and the third intake-side damper (77) are opened.

The first air taken in the first suction passageway (25) through the first inlet opening (20) flows into the first adsorption room (51) through the first exhaust-side damper (71). The air which has flown into the first adsorption room (51) passes through the first adsorption component (61). In the first adsorption component (61), moisture (water vapor) contained in the air is adsorbed onto the adsorbent. Consequently, in the first adsorption component (61), the air is dehumidified by such adsorption operation. The air dehumidified in the first adsorption component (61) flows out into the intake passageway (28) through the second intake-side damper (76), and is blown into a room as supplied air (SA).

The second air taken in the second suction passageway (27) through the second inlet opening (22) passes through the heat exchanger (45). In the heat exchanger (45), heat exchange is performed between hot water and air, thereby heating the air to about 60° C. The air heated in the heat exchanger (45) flows into the second adsorption room (52) through the third intake-side damper (77). The air which has flown into the second adsorption room (52) passes through the second adsorption component (62). The adsorbent of the second adsorption component (62) is heated by the air. Consequently, in the second adsorption component (62), moisture adsorbed onto the adsorbent by such reproduction operation is released into the air. The air which has taken moisture from the second adsorption component (62) flows out into the exhaust passageway (26) through the fourth exhaust-side damper (74), and is discharged to outside the room as exhausted air (EA).

<Second Batch Operation>

Figure 5:
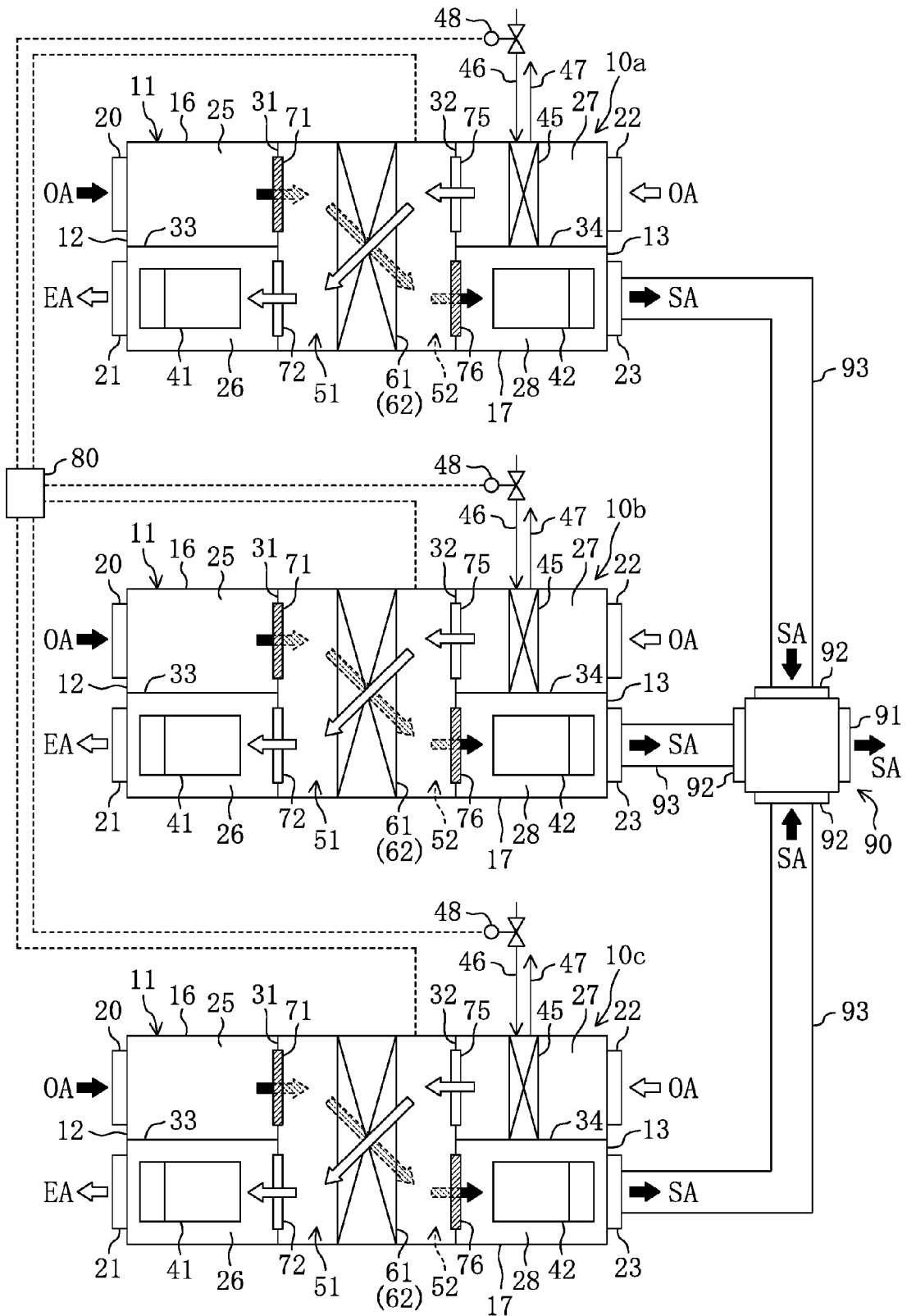
FIG. 5 is a cross-sectional view schematically illustrating a second batch operation of the dehumidification system of the embodiment.

As illustrated in FIG. 5, in the second batch operation, in each of the dehumidifiers (10a, 10b, 10c), the first exhaust-side damper (71), the fourth exhaust-side damper (74), the second intake-side damper (76), and the third intake-side damper (77) are closed, and the second exhaust-side damper (72), the third exhaust-side damper (73), the first intake-side damper (75), and the fourth intake-side damper (78) are opened.

The first air taken in the first suction passageway (25) through the first inlet opening (20) flows into the second adsorption room (52) through the third exhaust-side damper (73). The air which has flown into the second adsorption room (52) passes through the second adsorption component (62). In the second adsorption component (62), moisture (water vapor) contained in the air is adsorbed onto the adsorbent. Consequently, in the second adsorption component (62), the air is dehumidified by such adsorption operation. The air dehumidified in the second adsorption component (62) flows out into the intake passageway (28) through the fourth intake-side damper (78), and is blown into the room as supplied air (SA).

The second air taken in the second suction passageway (27) through the second inlet opening (22) passes through the heat exchanger (45). In the heat exchanger (45), heat exchange is performed between hot water and air, thereby heating the air to about 60° C. The air heated in the heat exchanger (45) flows into the first adsorption room (51) through the first intake-side damper (75). The air which has flown into the first adsorption room (51) passes through the first adsorption component (61). The adsorbent of the first adsorption component (61) is heated by the air. Consequently, in the first adsorption component (61), moisture adsorbed onto the adsorbent by such reproduction operation is released into the air. The air which has taken moisture from the first adsorption component (61) flows out into the exhaust passageway (26) through the second exhaust-side damper (72), and is exhausted to outside the room as exhausted air (EA).

In the dehumidifiers (10a, 10b, 10c) of this embodiment, the first batch operation and the second batch operation are alternately performed, thereby continuously dehumidifying the room, without saturation of moisture (i.e., excessive adsorption) of the adsorbents of the adsorption components. However, in such switching between the first batch operation and the second batch operation, the adsorption component which has changed from the reproduction state to the adsorption state is still at a relatively high temperature immediately after the switching between the batch operations in some cases. As a result, immediately after switching between the batch operations, air at a relatively high temperature is disadvantageously supplied as supplied air (SA) to the room.

Specifically, in the dehumidification operation, when the first batch operation is switched to the second batch operation, for example, the temperature of the second adsorption component (62) which is in the reproduction state in the first batch operation is increased to about 60° C., immediately after the first batch operation. If the next second batch operation is performed in this state, the temperature of the second adsorption component (62) to change into the adsorption state is still high, and air which has passed through this high-temperature second adsorption component (62) is disadvantageously supplied to the room. Consequently, the temperature of supplied air (SA) is relatively high immediately after the second batch operation. Thereafter, as the second batch operation is continuously performed, the second adsorption component (62) is cooled, thereby reducing the temperature of the supplied air (SA).

As described above, in the dehumidification operation of the dehumidifiers (10a, 10b, 10c), the supplied air (SA) reaches at the highest temperature immediately after a start of each of the batch operations. As the batch operation is continuously performed, the temperature of the supplied air (SA) decreases. Accordingly, in the dehumidification operation, the temperature of the supplied air (SA) significantly changes, thereby failing to keep the room temperature constant.

To prevent this problem, in the humidity control system (1) of this embodiment, switching between the first batch operation and the second batch operation in each of the dehumidifiers (10a, 10b, 10c) is performed at time intervals of predetermined times, and supplied air (SA) supplied from the dehumidifiers (10a, 10b, 10c) is collected and mixed in the chamber (90) so that a change in the temperature of air to be supplied into a room can be reduced.

Figure 6:
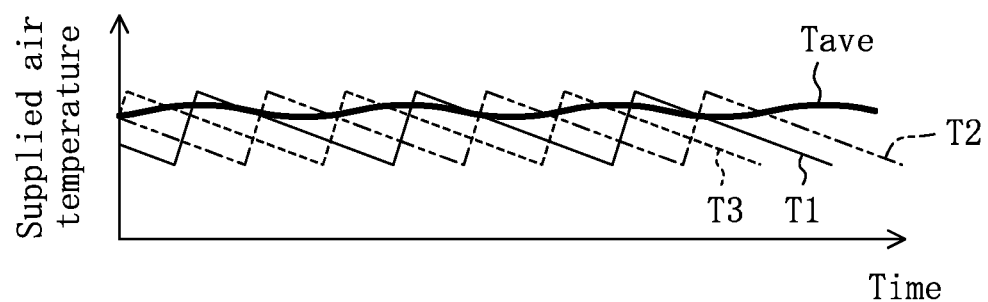
FIG. 6 is a graph showing a relationship between time and a supplied air temperature according to the embodiment.
Figure 7:
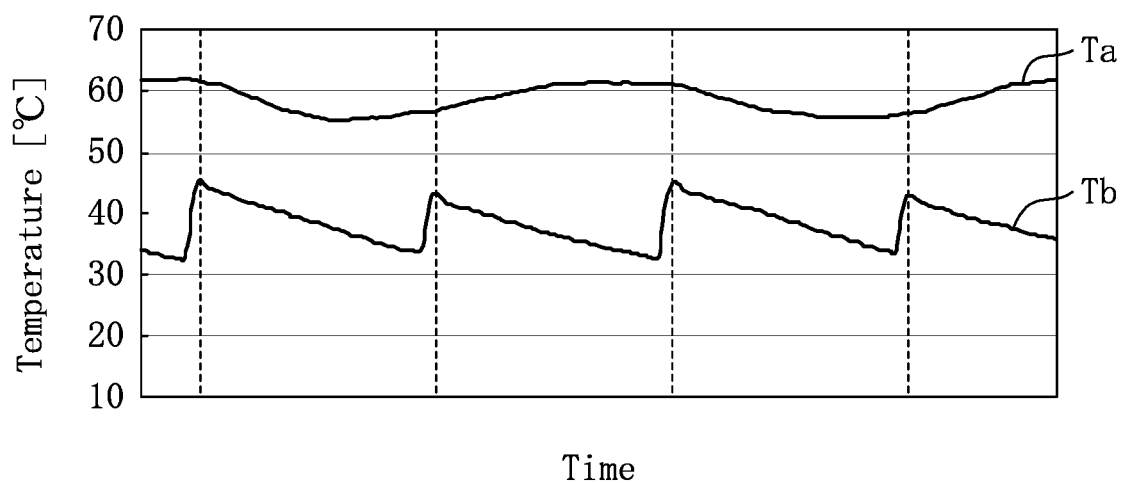
FIG. 7 is a graph showing a relationship among time, a reproduction temperature, and a supplied air temperature in a conventional technique.

Specifically, as shown in FIG. 6, among the first through third dehumidifiers (10a, 10b, 10c), switching between the batch operations is performed by the first dehumidifier (10a) first. At this time, the temperature of air supplied from the first dehumidifier (10a) to the chamber (90) is at the maximum immediately after the switching between the batch operations, and gradually decreases with time (indicated by T1 in FIG. 6).

Next, after a predetermined time (e.g., about one to four minutes) after the switching of the first dehumidifier (10a), switching between the batch operations is performed by the second dehumidifier (10b). With this operation, the temperature of air supplied from the second dehumidifier (10b) to the chamber (90) is at the maximum immediately after the switching between the batch operations, and gradually decreases with time (indicated by T2 in FIG. 6).

Then, after a predetermined time (e.g., about one to four minutes) after the switching of the second dehumidifier (10b), switching between the batch operations is performed by the third dehumidifier (10c). With this operation, the temperature of air supplied from the third dehumidifier (10c) to the chamber (90) is at the maximum immediately after the switching between the batch operations, and gradually decreases with time (indicated by T3 in FIG. 6).

In this manner, the temperatures of the air simultaneously supplied from the respective dehumidifiers (10a, 10b, 10c) to the chamber (90) have predetermined differences. Then, the supplied air is mixed together in the chamber (90) so that the temperatures of the air are averaged (indicated by Tave in FIG. 6). Thereafter, the air in the chamber (90) is supplied to the room.

—Advantages of Embodiment—

In the foregoing embodiment, switchings between batch operations of the three dehumidifiers (10a, 10b, 10c) are sequentially performed at time intervals of predetermined times (e.g., one to four minutes). Accordingly, the temperatures of the air simultaneously supplied from the respective dehumidifiers (10a, 10b, 10c) to the chamber (90) have predetermined differences. That is, the temperature relationship among air supplied from the dehumidifiers (10a, 10b, 10c) to the chamber (90) is constant, and thus, the average temperature of air mixed in the chamber (90) is also constant. Accordingly, the air whose temperature has been averaged by mixing can be supplied to the room. As a result, a change in the temperature of air supplied from the dehumidifiers (10a, 10b, 10c) to the room can be reduced.

Other Embodiments

In addition to the foregoing embodiment, the present invention may have the following configurations.

In the embodiment, the present invention is applied to the three dehumidifiers (10a, 10b, 10c). However, the number of the dehumidifiers may be two or four or more.

The foregoing embodiments are merely preferred examples in nature, and are not intended to limit the scope, applications, and use of the invention.

INDUSTRIAL APPLICABILITY

As described above, the present invention is useful for a mechanism for reducing a change in the temperature of air supplied from dehumidifiers to a room.

DESCRIPTION OF REFERENCE CHARACTERS 10a first dehumidifier
10b second dehumidifier
10c third dehumidifier
11 casing
45 heat exchanger
61 first adsorption component
62 second adsorption component
80 controller
90 chamber

The invention claimed is:

1. A humidity control system, comprising:
a plurality of dehumidifiers each including a casing in which air flows, two adsorption components provided in the casing and adsorbing moisture in air, and a heating mechanism provided in the casing and heating air to be supplied to the adsorption components, wherein each of the dehumidifiers alternately switches between a first operation in which air whose moisture has been adsorbed in the first adsorption component is supplied to a room and air heated in the heating mechanism is exhausted to outside the room through the second adsorption component, and a second operation in which air whose moisture has been adsorbed in the second adsorption component is supplied to the room and air heated in the heating mechanism is exhausted to outside the room through the first adsorption component;
a control mechanism configured to control the dehumidifiers such that the switchings of the respective dehumidifiers are performed at different timings; and an air collecting mechanism configured to collect air to be supplied from the dehumidifiers to the room.

2. The humidity control system of claim 1, wherein the control mechanism controls the dehumidifiers such that the switchings of the respective dehumidifiers are sequentially performed at time intervals of predetermined times.

* * * * *